United States Patent
Golubovic et al.

(10) Patent No.: US 11,300,458 B2
(45) Date of Patent: Apr. 12, 2022

(54) TEMPERATURE SENSING TAPE, ASSEMBLY, AND METHOD OF TEMPERATURE CONTROL

(71) Applicant: Littelfuse, Inc., Chicago, IL (US)

(72) Inventors: Boris Golubovic, San Francisco, CA (US); Martin G. Pineda, Fremont, CA (US); Yuriy Borisovich Matus, Pleasanton, CA (US); Jianhua Chen, Sunnyvale, CA (US)

(73) Assignee: Littelfuse, Inc., Chicago, IL (US)

( * ) Notice: Subject to any disclaimer, the term of this patent is extended or adjusted under 35 U.S.C. 154(b) by 162 days.

(21) Appl. No.: 16/825,114

(22) Filed: Mar. 20, 2020

(65) Prior Publication Data

US 2020/0217724 A1    Jul. 9, 2020

Related U.S. Application Data

(63) Continuation-in-part of application No. 16/122,535, filed on Sep. 5, 2018.

(Continued)

(51) Int. Cl.
*G01K 3/14* (2006.01)
*G01K 7/22* (2006.01)
(Continued)

(52) U.S. Cl.
CPC ........... *G01K 7/223* (2013.01); *H01H 85/048* (2013.01); *H01M 10/486* (2013.01); *G01K 1/14* (2013.01); *G01K 3/14* (2013.01); *G01K 13/00* (2013.01)

(58) Field of Classification Search
CPC .......... G01K 3/005; G01K 7/22; G01K 7/223; G01K 13/00; G01K 7/183; G01K 1/14; G01K 2207/00; G01K 3/14; H01H 37/761; H01H 85/055; H01H 85/0052; H01H 85/048; H01M 10/486
See application file for complete search history.

(56) References Cited

U.S. PATENT DOCUMENTS 2,290,105 A * 7/1942 Lindell ............... H01H 85/042
337/158
3,297,846 A * 1/1967 Peltier .................... G08B 17/06
337/416
(Continued)

FOREIGN PATENT DOCUMENTS

CA         2124896 A1 * 12/1994 ........... E05B 65/104
CN       101521963 A       9/2009
(Continued)

*Primary Examiner* — Gail Kaplan Verbitsky
(74) *Attorney, Agent, or Firm* — Kacvinsky Daisak Bluni PLLC (57) ABSTRACT

A temperature sensing tape including a flexible, electrically insulating substrate, a plurality of temperature sensing elements disposed on the substrate, each temperature sensing element including a first electrode and a second electrode arranged in a confronting, spaced-apart relationship to define a gap therebetween, and a variable resistance material disposed within the gap and connecting the first electrode to the second electrode, wherein the first electrode of at least one of the temperature sensing elements is connected to the second electrode of an adjacent temperature sensing element by a flexible electrical conductor.

18 Claims, 7 Drawing Sheets

Related U.S. Application Data (60) Provisional application No. 62/554,088, filed on Sep. 5, 2017.

(51) Int. Cl.
  H01M 10/48 (2006.01)
  H01H 85/048 (2006.01)
  *G01K 1/14* (2021.01)
  *G01K 13/00* (2021.01)

(56) References Cited

U.S. PATENT DOCUMENTS

| | | | |
|---|---|---|---|
| 4,574,264 A | 3/1986 | Takahashi et al. | |
| 4,636,765 A * | 1/1987 | Krueger | H01H 85/0458 337/158 |
| 4,710,550 A | 12/1987 | Kranbuehl | |
| 4,968,964 A | 11/1990 | Nagai et al. | |
| 5,192,940 A * | 3/1993 | Yajima | B60H 1/00828 337/405 |
| 5,197,804 A | 3/1993 | Tani et al. | |
| 5,199,791 A | 4/1993 | Kasanami et al. | |
| 5,831,512 A | 11/1998 | Wienand | |
| 6,140,906 A | 10/2000 | Kaihara | |
| 6,155,711 A | 12/2000 | Schaupert et al. | |
| 6,159,386 A | 12/2000 | Wienand et al. | |
| 6,445,276 B2 * | 9/2002 | Schon | H01H 85/46 337/184 |
| 6,445,277 B1 * | 9/2002 | Ishikawa | H01C 7/12 337/290 |
| 6,974,249 B1 | 12/2005 | Fair et al. | |
| 7,253,740 B2 * | 8/2007 | Cain | G01K 3/005 340/596 |
| 7,598,840 B2 * | 10/2009 | Lu | H01C 7/126 337/183 |
| 7,944,360 B2 * | 5/2011 | Kim | G01K 7/01 340/584 |
| 8,864,373 B2 * | 10/2014 | Vu | G01R 31/382 374/152 |
| 9,000,351 B2 * | 4/2015 | Noda | H01H 37/761 250/214.1 |
| 9,829,390 B2 | 11/2017 | Wienand et al. | |
| 9,851,262 B2 | 12/2017 | Nagatomo et al. | |
| 9,891,117 B2 | 2/2018 | Inaba et al. | |
| 10,488,272 B2 | 11/2019 | Uozumi et al. | |
| 10,502,638 B2 | 12/2019 | Miura et al. | |
| 10,631,372 B2 | 4/2020 | Feng et al. | |
| 2004/0100355 A1 * | 5/2004 | Tanaka | H01H 37/761 337/404 |
| 2006/0199003 A1 * | 9/2006 | Cain | G01K 3/005 428/343 |
| 2013/0044401 A1 * | 2/2013 | Yeh | H01M 10/446 361/93.8 |
| 2014/0153613 A1 | 6/2014 | Wienand et al. | |
| 2015/0071326 A1 | 3/2015 | Nagatomo et al. | |
| 2015/0092820 A1 | 4/2015 | Tanaka et al. | |
| 2015/0260586 A1 | 9/2015 | Inaba et al. | |
| 2016/0189831 A1 | 6/2016 | Fujita et al. | |
| 2017/0127944 A1 | 5/2017 | Sun | |
| 2018/0289082 A1 | 3/2018 | Burrows | |
| 2019/0331536 A1 | 10/2019 | Hioki et al. | |
| 2020/0348186 A1 | 11/2020 | Suzuki et al. | |

FOREIGN PATENT DOCUMENTS

| | | | | |
|---|---|---|---|---|
| CN | 101907497 A | | 12/2010 | |
| CN | 102052972 A | | 5/2011 | |
| CN | 102310290 A | | 1/2012 | |
| CN | 103210290 A | | 7/2013 | |
| CN | 104204751 A | | 12/2014 | |
| DE | 3008141 A | * | 3/1980 | |
| DE | 4143095 C1 | * | 4/1993 | H01H 85/0241 |
| FR | 2305845 A1 | * | 10/1976 | H01H 87/00 |
| FR | 2477761 A1 | * | 9/1981 | H01F 29/04 |
| IT | 1034542 B | * | 10/1979 | |
| JP | 2001250701 A | | 9/2001 | |
| JP | 3692042 B2 | * | 9/2005 | H01M 50/572 |
| JP | 1997184770 | | 12/2014 | |
| KR | 20060028661 A | | 3/2006 | |
| KR | 20130128383 A | | 11/2013 | |
| WO | 2012001465 A1 | | 1/2012 | |
| WO | 2017130913 A1 | | 8/2017 | |

* cited by examiner

TEMPERATURE SENSING TAPE, ASSEMBLY, AND METHOD OF TEMPERATURE CONTROL

CROSS-REFERENCES TO RELATED APPLICATIONS

This application is a continuation in part of and claims benefit to U.S. Non provisional patent application Ser. No. 16/122,535, filed Sep. 5, 2018, and further claims the benefit of U.S. Provisional Patent Application No. 62/554,088, filed Sep. 5, 2017, each of which applications is incorporated by reference herein in its entirety.

BACKGROUND

Field

The present embodiment relate generally to temperature sensing devices. More specifically, the present embodiments relate to a temperature sensing tape having a plurality of integrated temperature sensing elements formed of variable resistance material.

Description of Related Art

Electrical devices can be damaged by overtemperature and overcurrent conditions if such conditions are allowed to persist. Thus, it is common for electrical devices to be equipped with temperature sensing devices that can be used to measure temperature variations at discrete locations on the surface of an electrical device. If a measured temperature exceeds a predetermined threshold, the electrical device may be automatically shut off until the overtemperature/overcurrent condition subsides or is remedied, thereby mitigating damage to the electrical device.

Some electrical devices have large surface areas or include numerous interconnected components that may individually experience overtemperature and/or overcurrent conditions. In such devices, it may be necessary to measure temperatures at various discrete locations on the surface of an electrical device, or to measure temperatures on the surfaces of a plurality of components of an electrical device in a distributed manner. However, implementing a plurality of traditional, discrete temperature sensing elements in a single electrical device can be prohibitively expensive and/or may require an amount of space that is not available in a given device form factor.

It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An exemplary embodiment of a temperature sensing tape in accordance with the present disclosure may include an electrically insulating substrate, a first conductor disposed on the substrate and terminating in a first electrode, a second conductor disposed on the substrate and terminating in a second electrode, wherein the first electrode and the second electrode are disposed in a confronting, spaced-apart relationship to define a gap therebetween, and a variable resistance material disposed within the gap and connecting the first electrode to the second electrode.

Another exemplary embodiment of a temperature sensing tape in accordance with the present disclosure may include a flexible, electrically insulating substrate, a plurality of temperature sensing elements disposed on the substrate, each temperature sensing element including a first electrode and a second electrode arranged in a confronting, spaced-apart relationship to define a gap therebetween, and a variable resistance material disposed within the gap and connecting the first electrode to the second electrode, wherein the first electrode of at least one of the temperature sensing elements is connected to the second electrode of an adjacent temperature sensing element by a flexible electrical conductor.

DETAILED DESCRIPTION

Exemplary embodiments of a temperature sensing tape in accordance with the present disclosure will now be described more fully hereinafter with reference to the accompanying drawings. The temperature sensing tape may, however, be embodied in many different forms and should not be construed as being limited to the embodiments set forth herein. Rather, these embodiments are provided so that this disclosure will convey certain exemplary aspects of the temperature sensing tape to those skilled in the art.

Figure 1A:
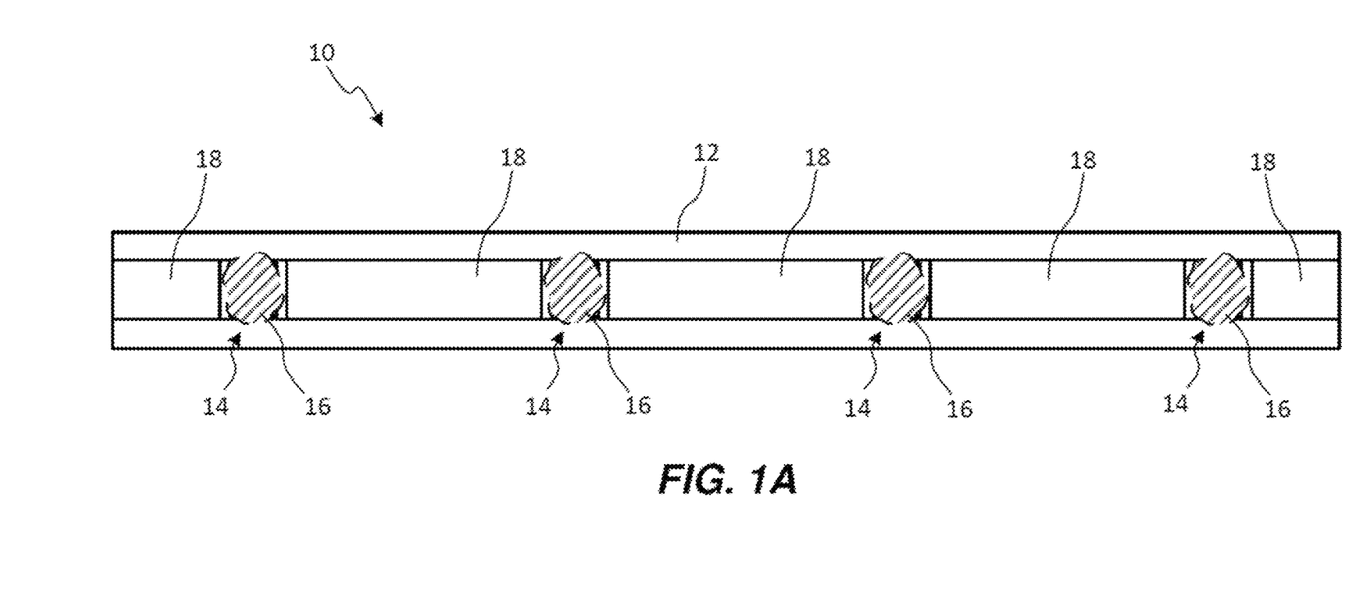
FIG. 1A is a top view illustrating an exemplary embodiment of a temperature sensing tape in accordance with the present disclosure.

Referring to FIG. 1A, a top view illustrating a temperature sensing tape (hereinafter "the tape 10") in accordance with an exemplary embodiment of the present disclosure is shown. The tape 10 may include an electrically insulating, flexible substrate, shown as substrate 12. The substrate 12 may be formed of a strip of dielectric material having an adhesive material on one or both sides thereof for allowing the tape 10 to be adhered to a surface (e.g., a surface of an electrical device). In various, non-limiting embodiments, the substrate 12 may be Scotch Tape, polyvinyl chloride (PVC) tape, Mylar, etc.

A plurality of temperature sensing elements 14 may be disposed on the substrate 12 and may be spaced apart from one another along a length of the substrate 12. Each of the temperature sensing elements 14 may include a quantity of variable resistance material 16 bridging a pair of adjacent, interdigitated electrodes as further described below. By way of example, the tape 10 is shown in FIG. 1A as including a total of four temperature sensing elements. In various embodiments, the tape 10 may include a greater or fewer number of temperature sensing elements 14 without departing from the present disclosure, with the total number of temperature sensing elements 14 generally being dictated by the length of the tape 10 and the distance between the temperature sensing elements 14. While the temperature sensing elements 14 are shown in FIG. 1A as being evenly spaced apart from one another along the length of the substrate 12, various embodiments of the tape 10 may include temperature sensing elements 14 disposed at irregular intervals along the length of the substrate 12, such as may be dictated by the requirements of a particular application of the tape 10.

The tape 10 may further include a plurality of flexible conductors 18 disposed on the substrate 12. The flexible conductors 18 may extend between, and may be electrically connected to, the temperature sensing elements 14 as further described below. The flexible conductors 18 may be formed of elongated segments of flexible, electrically conductive material that may be adhered to, printed on, or otherwise applied to the substrate 12. Examples of such materials include, but are not limited to, copper mesh, silver epoxy, various types of metal wire or ribbon, conductive ink, etc.

Figure 1B:
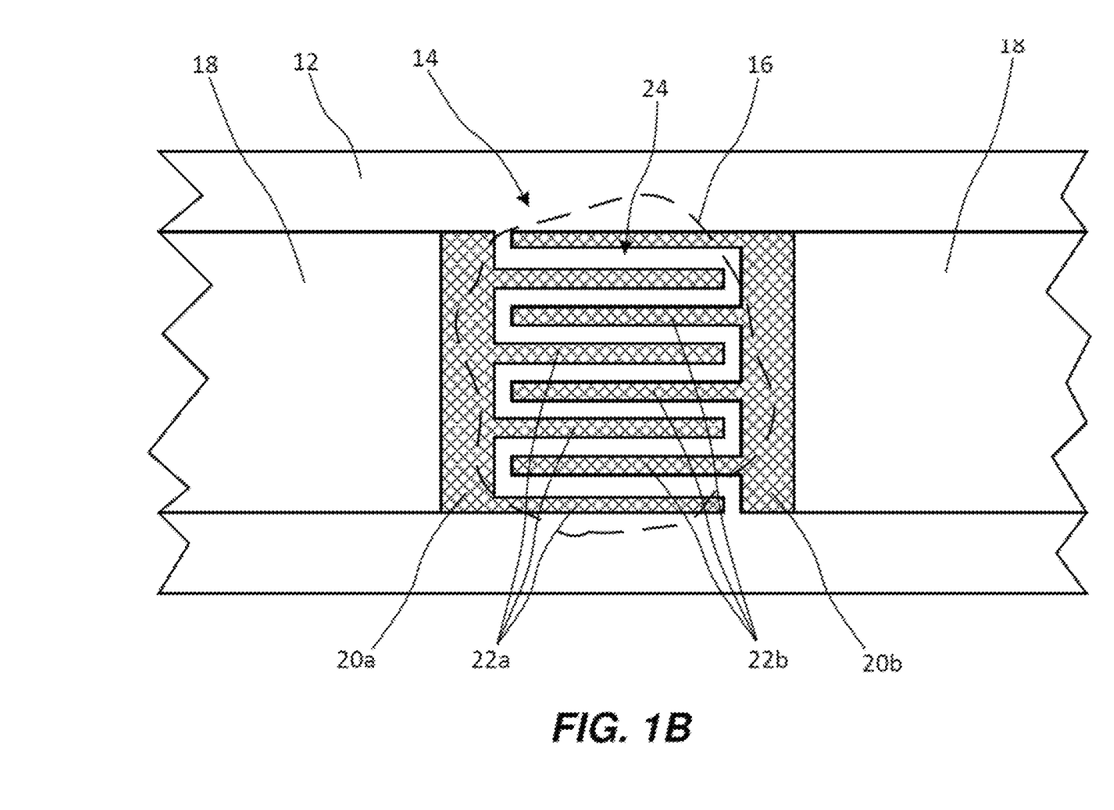
FIG. 1B is a detailed top view illustrating a temperature sensing element of the temperature sensing tape shown in FIG. 1A.

Referring to FIG. 1B, a detailed top view illustrating one of the temperature sensing elements 14 and surrounding portions of the tape 10 is shown. The variable resistance material 16 is shown as transparent for clarity of the following description. It will be understood that all of the temperature sensing elements 14 shown in FIG. 1A are substantially identical to the temperature sensing element 14 shown in FIG. 1B and that the following description of the temperature sensing element 14 shown in FIG. 1B shall therefore apply to all of the temperature sensing elements 14 shown in FIG. 1A.

The temperature sensing element 14 may include electrodes 20*a, b* that are disposed on the substrate 12 in a confronting arrangement and that are electrically connected to ends of adjacent flexible conductors (flexible conductors 18) (e.g., with solder, conductive adhesive, etc.). Each of the electrodes 20*a, b* may include a plurality of fingers or tines 22*a, b*. The tines 22*a* of the electrode 20*a* may be disposed in an interdigitated, spaced-apart relationship with the tines 22*b* of the electrode 20*b* to define a serpentine, tortuous gap 24 therebetween. In some embodiments of the tape 10, the electrodes 20*a, b* may be disposed on an intermediate substrate (e.g., a segment of FR-4) which substrate may in-turn be disposed on, and adhered to, the substrate 12. In other embodiments of the tape 10, the electrodes 20*a, b* may be integral, contiguous portions of the flexible conductors 18. For example, confronting ends of the adjacent flexible conductors 18 may be cut, printed, or otherwise formed to define the interdigitated tines 22*a, b*. In other embodiments of the tape 10, the tines 22*a, b* may be omitted, and the adjacent ends of the flexible conductors 18 may instead terminate in flat edges or in edges having various other contours or shapes, the edges being spaced apart from one another and disposed in a confronting relationship to define a gap therebetween.

The variable resistance material 16 may be disposed on the tines 22*a, b* and may bridge and/or fill the gap 24, thus connecting the tines 22*a* to the tines 22*b*. In various embodiments, the variable resistance material 16 may be a positive temperature coefficient (PTC) material having an electrical resistance that may increase sharply when the variable resistance material 16 reaches a predefined "activation temperature." In other embodiments, the variable resistance material 16 may be a negative temperature coefficient (NTC) material having an electrical resistance that may decrease sharply when the variable resistance material 16 reaches a predefined "activation temperature." In a specific, non-limiting embodiment, the variable resistance material 16 may be a polymeric positive temperature coefficient (PPTC) material formed of conductive particles (e.g., conductive ceramic particle) suspended in a polymer resin. In some embodiments, the variable resistance material 16 (either PTC or NTC) may be applied to the tines 22*a, b* as a fluidic ink or as a compound that may be subsequently cured to form a solid mass that partially covers and/or envelopes the tines 22*a, b*.

It is contemplated that the tape 10 can be rolled and stored in the manner of a conventional roll of tape, and that a desired length of the tape 10 can be dispensed (i.e., unrolled) and cut from the roll for use in an application.

Figure 2:
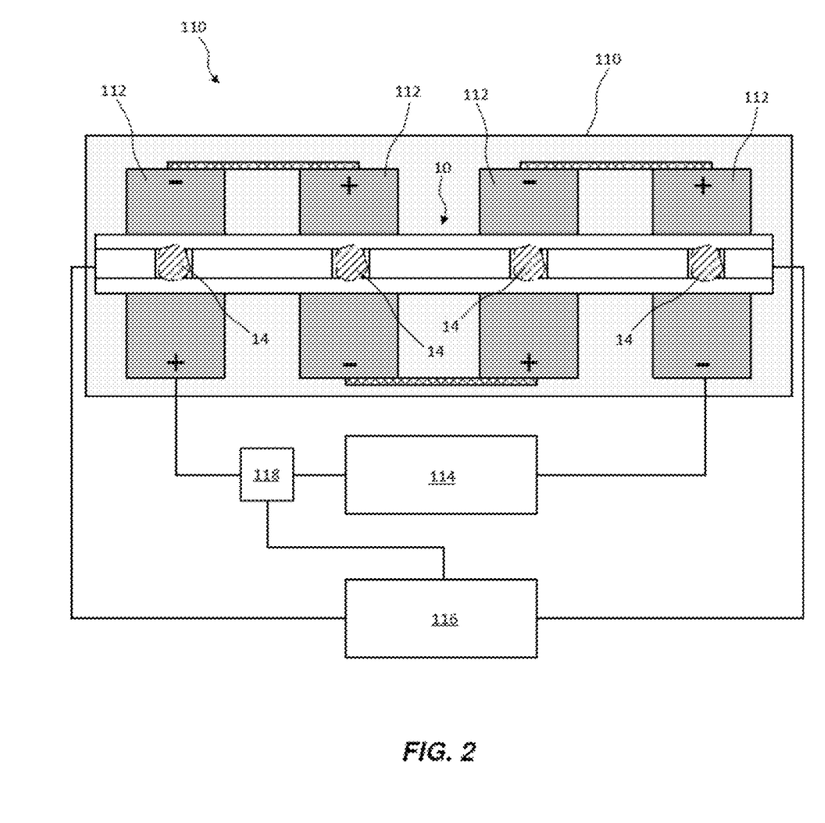
FIG. 2 is a schematic view illustrating an exemplary embodiment of an electrical device implementing the temperature sensing tape shown in FIG. 1A.

Referring to FIG. 2, a schematic illustration of an exemplary electrical device 100 implementing the above-described tape (tape 10) is shown. The electrical device 100 may include one or more components (hereinafter "the protected component") that may be protected by the tape 10. In the exemplary embodiment shown in FIG. 2, the protected component is a battery 110 having a plurality of cells 112 that are electrically connected in series. The battery 110 may be connected to a load 114 for supplying electrical power thereto. In various examples, the battery 110 may be a Li-ion battery, a Li-Polymer battery, a Ni-MH rechargeable battery, or the like. The present disclosure is not limited in the regard, and it is contemplated that the protected component may alternatively be, or may alternatively include, any of a variety of electrical power sources and/or electrical devices that may benefit from overcurrent or overtemperature protection.

The tape 10 may be adhered to the battery 110, with the temperature sensing elements 14 disposed on surfaces of respective cells (cells 112) of the battery 110. Particularly, each of the temperature sensing elements 14 may be positioned so as to be under the thermal influence of a respective one of the cells 112 such that an increase in a temperature of one of the cells 112 may cause an increase in a temperature of a respective one of the temperature sensing elements 14 disposed thereon.

The electrical device 100 may further include a control element 116 (e.g., a digital control element such as an ASIC, a microprocessor, etc.) that may be electrically connected to the flexible conductors 18 of the tape 10 and that may be configured to monitor a resistance in the tape 10 as further described below. The control element 116 may also be operatively connected to a disconnect switch 118 (e.g., a FET, a relay, etc.) that may be connected in electrical series intermediate the battery 110 and the load 114.

During normal operation of the electrical device 100, the battery 110 may supply electrical power to the load 114, and the temperatures of the cells 112 may be within a normal operating range (e.g., less than 80 degrees Celsius). However, upon the occurrence of an overtemperature or overcurrent condition, the temperature of one or more of the cells 112 may increase above the normal operating range, which increase may in-turn cause the temperatures of respective temperature sensing elements 14 of the tape 10 to increase. If the temperature of one or more of the temperature sensing elements 14 increases above the activation temperature, the resistance in the tape 10 may increase sharply (if the variable resistance material 16 is a PTC material) or decrease sharply (if the variable resistance material 16 is a NTC material). An increase in the temperatures of the cells 112 may result from exposure to an external heat source (e.g., the electrical device 100 sitting out in the sun), or from an overcurrent condition caused by an internal fault in the battery 110, for example.

The control element 116 may be configured to monitor a resistance of the tape 10 and to control operation of the electrical device 100 accordingly. For example, assuming the variable resistance material 16 is a PTC material, if the control element 116 measures a relatively low resistance in the tape 10, indicating that the temperatures of the temperature sensing elements 14 are below the activation temperature, the control element 116 may determine that the temperatures of the cells 112 are within a normal, safe operating range. However, if the control element 116 measures a relatively high resistance in the tape 10, indicating that the temperature of one of more of the temperature sensing elements 14 is above the activation temperature, the control element 116 may determine that the temperature of one or more of the cells 112 has exceeded the normal, safe operating range. If the control element 116 determines that the temperature of one or more of the cells 112 has exceeded the normal, safe operating range, the control element 116 may open the disconnect switch 118, thereby arresting the flow of current in the electrical device 100 and preventing or mitigating damage that could otherwise result if the overtemperature or overcurrent condition were allowed to persist.

In additional non-limiting embodiments, a protected component may include a power tool having a battery pack, an e-scooter or other electric vehicle, a laptop computer, a notebook computer, a large battery system. Ad advantage afforded by a flexible tape of the present embodiments is the ability to conveniently place a sensor of plurality of temperature sensors, as well as fuse elements at any suitable location in a three-dimensional object having any arbitrary shape.

Regarding the aforementioned embodiments, in some variants, the substrate 12 may have an adhesive on a bottom side of the tape 10, for attachment to a device being protected, on a bottom side of the tape 10, for attachment to a device being protected. In some embodiments, adhesive can be applied to just sections under a temperature sensing element 14, to improve thermal contact to a surface of a device being protected. In particular embodiments, additives that have high thermal conductivity may be arranged within an adhesive, such as a high thermal conductivity powder, to improve thermal conductivity of the adhesive, and thus provide better thermal contact between a temperature sensing element 14 and device being monitored or protected. Non-limiting examples of thermal high conductivity materials include intrinsic (low electrical conductivity) ZnO, $Al_2O_3$, AlN diamond paste, or high-thermal-conductivity electrically conductive particles including ceramic, metal or carbon based particles, fibers etc.

In additional embodiments of the disclosure, a tape type sensor may be employed for additional applications, including setP™ temperature sensor devices (setP is a trademark of Littelfuse, Inc), and so forth, etc, where a permanent disconnect may be generated at temperatures above functional material sensing operation conditions. Said differently, a "TTape" sensor or sensor assembly may be deployed for temperature sensing and temperature protection for stable "off" response behavior at temperatures above the temperature range where a TTape material such as PTC material operates stably.

By way of clarification, pPTC type materials provide good temperature sensor capability including significant current shut off above a trip temperature. However, pPTC materials may notably suffer from negative temperature coefficient of resistance (NTC) behavior significantly above the trip temperature and upon long exposure may fail in the short state.

For applications in a critical area such as temperature sensing for lithium batteries it is useful for an "off" signal for a given battery pack that is sent to a control board to be maintained for some duration, in order to avoid a nuisance tripping phenomenon, and to ensure the system "knows" that the system is in a high temperature position with severe NTC behavior, as opposed to a low temperature safe area. This case is especially important for the sensors operating in a digital response mode "0" and "1" and provides ability to extend region "1".

Figure 3A:
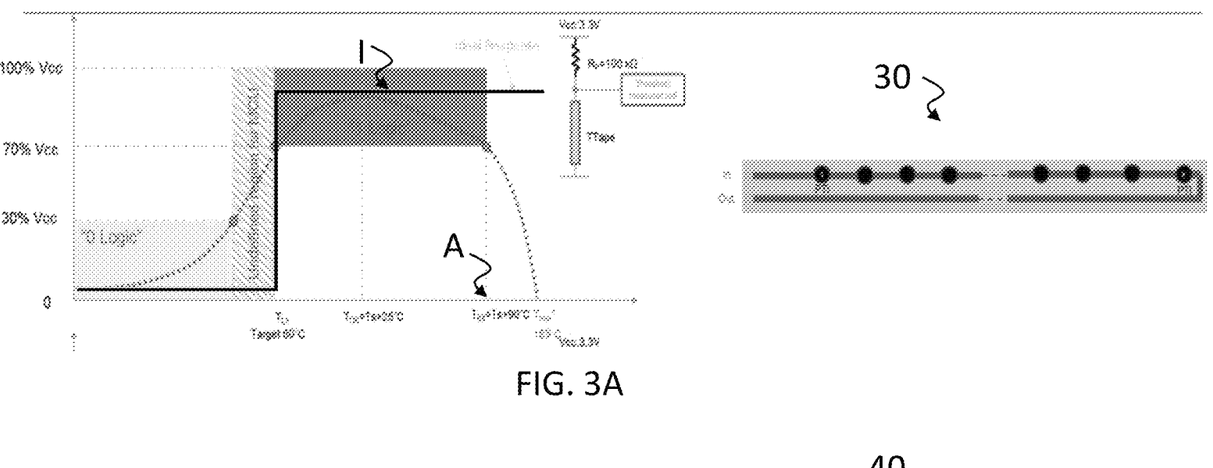
FIG. 3A and FIG. 3B illustrate the resistance curve and logical state behavior for PPTC based sensor with and without extension of the logical "1" state, respectively.
Figure 3B:
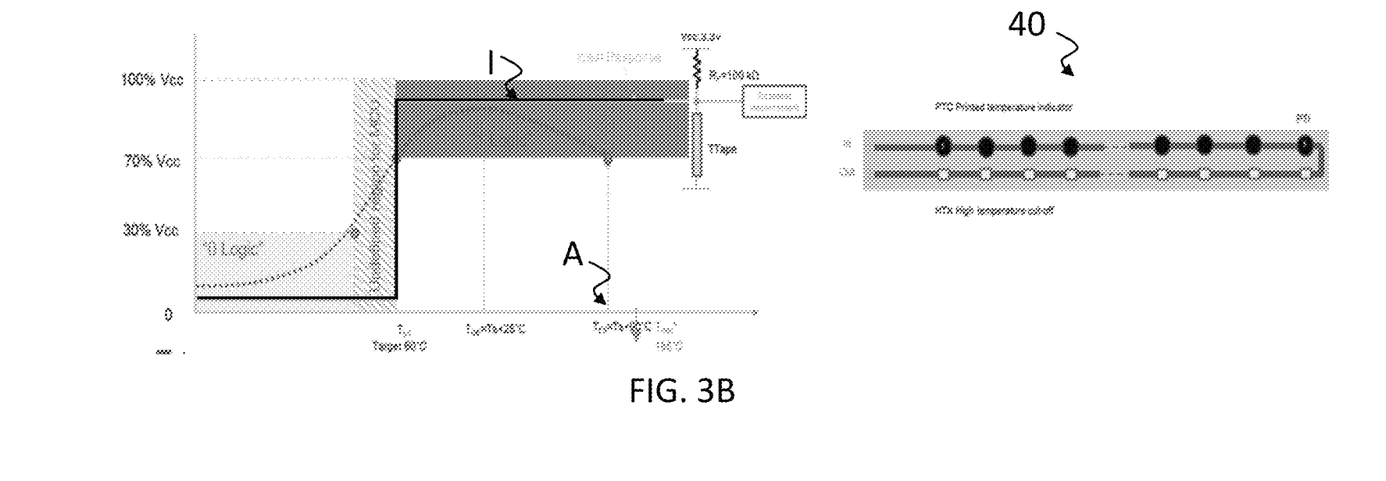

In accordance with some embodiments, a TTape sensor assembly is provided having a stable "off response" at temperatures above the temperature range of PPTC stability. FIG. 3A and FIG. 3B illustrate the resistance curve and logical state behavior for PPTC based sensor with and without extension of the logical "1" state, respectively. In the example of FIG. 3A, a tape 30 is provided with a series of temperature sensing elements, such as temperature sensing elements 14 as described previously, disposed on an "in" line. In the example of the resistance curve (dotted curve) of FIG. 3A, above the point A, the resistance rapidly decreases due to the NTC behavior of the PPTC material well above the trip temperature, unlike an ideal response curve I. Thus, above the point A, the resistance measured is no longer indicative of the logical "1" state, and the system may erroneously believes that a safe state exists if the logical "1" state has not persisted for a sufficient duration.

In FIG. 3B, a tape 40 is provided with a series of temperature sensing elements, such as temperature sensing elements 14 as described previously, disposed on an "in" line, as well as corresponding fuse elements, disposed on an "out" line, where a temperature sensing element may be paired with a proximate fuse element to form a sensing area that effectively extends the temperature range of the logical "1" state, as shown in FIG. 3B. In this example, the tape 40 may fuse above the point A, before the resistance of the PPTC material decreases to the point where the overall resistance detected falls below the logical "1" threshold value. Thus, the detection of the logical "1" state may persist.

Figure 3C:
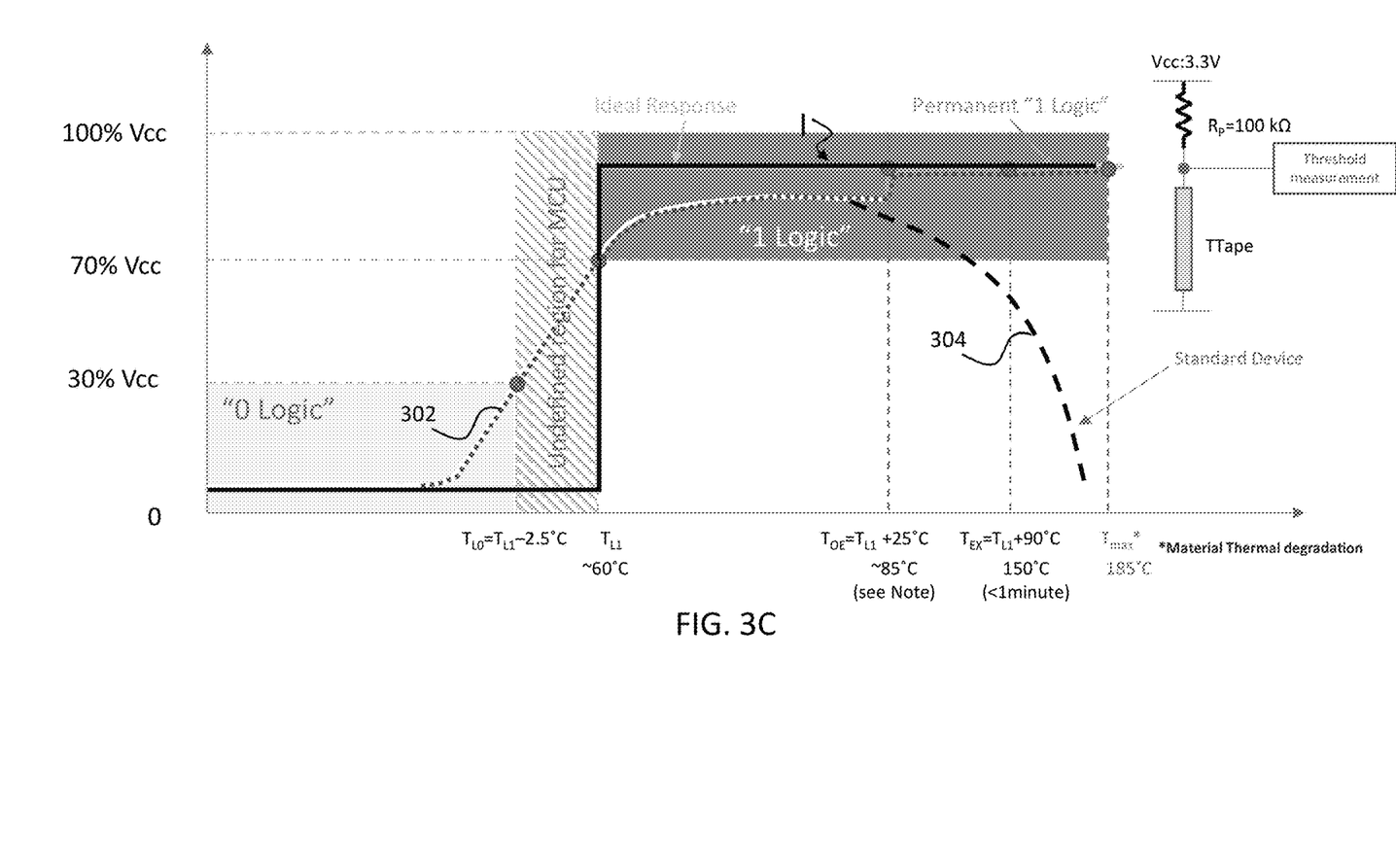
FIG. 3C illustrates further details of the electrical response of tape arranged according to embodiments of the disclosure.

Further details of the operation of a tape such as tape 40, are provided with respect to FIG. 3C. The exact temperatures for different regimes, indicative of a logic "0" or logic "1" state are merely exemplary. As shown, during operation, when the tape exhibits a temperature below approximately 57.5 C, a logic "0" state obtains, where the device being monitored may be deemed to be operating under normal conditions. Thus, the resistance remains low, as represented by a detector that detects the system voltage, Vcc. In the example shown, any voltage value less than 30% Vcc is deemed by the logic of a detector or monitor to represent the logic "0" state. Moreover, to provide proper discrimination, any voltage value that is greater than 70% Vcc may be deemed to indicate a logic "1" state.

In the example of FIG. 3C, the tape may include a PPTC sensor that has a trigger temperature of 60 C. Thus, when the tape exhibits a temperature above approximately 57.5 C and below approximately 60 C, a transition regime is entered, where the logic state may be indeterminate, since Vcc is between 30% and 70%. Above 60 C, a logic "1 state is entered, where tape resistance increases markedly, such as by a factor of 10×, 100×, 1000×, 10, 000× in some embodiments. This large increase in resistance results in a much higher Vcc, such as approximately 85% of full Vcc. Additionally, the resistance may plateau in the temperature range above the trip temperature of 60 C, where the logic 1 regime persists.

At approximately 85 C, a fuse element may fuse, thus causing tape resistance to increase further, following the resistance curve 302 (dotted line), where resistance has a value approaching 100% Vcc, such as 95 Vcc. As the tape heat up further to for example 185 C, the resistance remains at the high value, and the logic "1" state is still detected by a monitor. Notably, according to some embodiments, the fuse temperature of a fuse element may be chosen to lie near the "NTC temperature" of a PPTC-based sensor, where resistance of the PPTC material begins to decrease, as a function of increased temperature. Thus, as shown in the PPTC curve 304 (dashed line), without presence of a fuse element that fuses at 85 C, the resistance and therefore Vcc detected for a tape having just a PPTC sensor, may decrease rapidly above 85 C. At a temperature between 85 C and 150 C, the PPTC curve 304 shows Vcc decrease below the value for logic "1" and thus generates a false negative, in that that monitor no longer senses that the tape is experiencing a high temperature. By providing a fuse element that increases resistance of the tape before the PPTC resistance has decreases sufficiently to leave the logic "1" state, the false negative is avoided.

According to various embodiments of the disclosure, the construction of a temperature sensor with stable "off" response at temperatures above PTC stability may be performed in a manner where the PTC sensing area is arranged near or in the immediate contact with a fusable element that is triggered at a slightly higher or much higher temperature than the PTC trigger response. Examples of such solution is shown below in FIGS. 4A, 4B, and 4C, further shown in image form in FIG. 4D and FIG. 4E. In various non-limiting embodiments, the pPTC trigger response temperature of a TTape may be in the range area of 50° C. to 100° C., depending on choice of the pPTC material. In various non-limiting embodiments, a fusable (meltable) element provided near the pPTC material may be constructed from a solder element whose composition may be tailored to generate a fuse temperature of 90° C. to 150° C. or even higher. Control of the triggered temperature on the meltable fuse may be accomplished by adjusting the fuse alloy composition, with variation of known alloys such as SnBi, In, InSn, SnPb and other alloys.

Figure 4A:
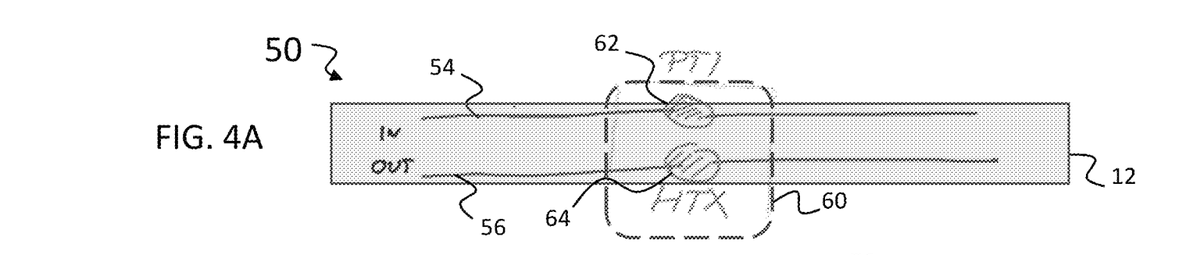
FIGS. 4A-4C depict different configurations of temperature sensing tape according to different embodiments of the disclosure.
Figure 4B:
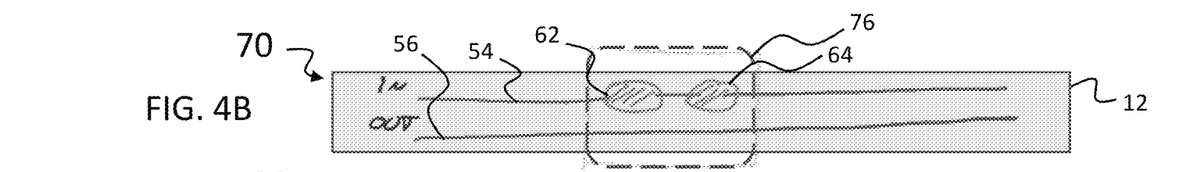
Figure 4C:
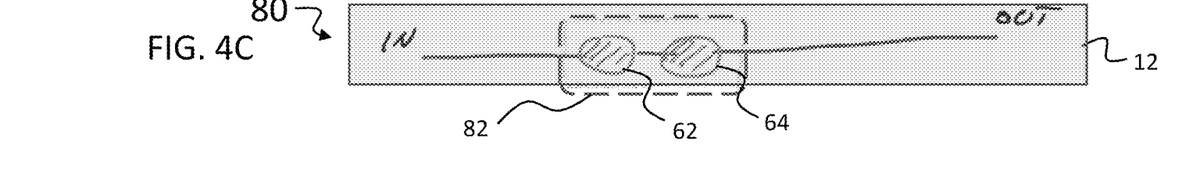

In accordance with embodiments of the disclosure, in order to generate extension of the logical "1" state, a high thermal cut off (HTX) region may be located in close proximity or co-located with a PTC element of a sensor, as illustrated in FIG. 4A. 4B and FIG. 4C. In some embodiments, the PTC material may be located on an "in" line, while the fuse element may be located on an "out" line, as shown in FIG. 4A. Turning now to FIG. 4A, there is shown a tape 50, arranged in accordance with embodiments of the disclosure. In this example a sensing area 60 is arranged on a portion of a substrate 12, where the sensing area includes a printed temperature indicator (PTI) 62, arranged on an "in" line 54, and a high temperature cutoff (HTX) element 64, arranged on an "out" line 56. The printed temperature indicator 62 may be arranged similarly or the same as the temperature sensing elements 14, described above. A separation between HTX and PTI components in this arrangement and other arrangements may range from a minimum between 75 μm and 1 mm, with no particular upper limit in a maximum separation. Additionally, in some embodiments, the electrode configuration for PTI 62 of FIG. 4A may resemble the configuration of FIG. 2 or may have a simpler structure having a simple planar gap, depending upon resistivity and other requirements.

However, in some embodiments, a simpler temperature sensing element may be used, having opposing electrodes that are generally planar electrodes, rather than interdigitated electrodes, or curved electrodes. The embodiments are not limited in this context. The HTX element 64 may be a suitable meltable fuse element, where the fuse temperature is designed at a suitable temperature for a given application.

In operation, when a trip temperature of the PTI 62 is exceeded in the sensing area 60, the tape 50 will rapidly increase in resistance, and a system (see FIG. 2) connected to the tape 50 will indicate a logical "1" to generate an off signal for controlling components, such as a battery pack. If an overheating event that triggers the trip temperature of the PTI 62 does not cause the sensing area 60 to exceed the fuse temperature of HTX element 64, the system, including a battery pack may be reset when the temperature reduces to a low temperature below the trip temperature of the PTI 62, generating a logical "0" signal. If the overheating event that triggers the logical "1" signal persists to the extent that the fuse temperature of the HTX element 64 is exceeded in the sensing area 60, the HTX element 64 will fuse, creating a permanent disconnect in the conductive circuit including the "in" line 52 and "out" line 54.

In other embodiments, shown in FIG. 4B, a PPTC material and fuse element may be located on an "in" line. In FIG. 4B, a tape 70 is arranged similarly to the tape 50, except that a sensing area 76 is characterized by the PTI 62 and the HTX element 64 being located electrically in series with one another along the "in: line 54. From a functional point of view, in operation, the tape 70 may respond similarly to tape 50, as described above.

In other embodiments, an "in" line and "out" line may be arranged linearly on a substrate 12, as shown in the tap 80 of FIG. 4C, where the sensor area 82 is arranged as shown, and may operate similarly to the embodiments of FIG. 4A and FIG. 4B.

According to various embodiments, the spacing between PTI elements and HTX elements in an exemplary tape may be chosen according to an application. For example, the spacing may range from 0.1 mm to 1000 mm in various non-limiting embodiments, assuming a size range for PTI element and HTX element in the range of 0.1 mm to 10 mm.

Figure 5:
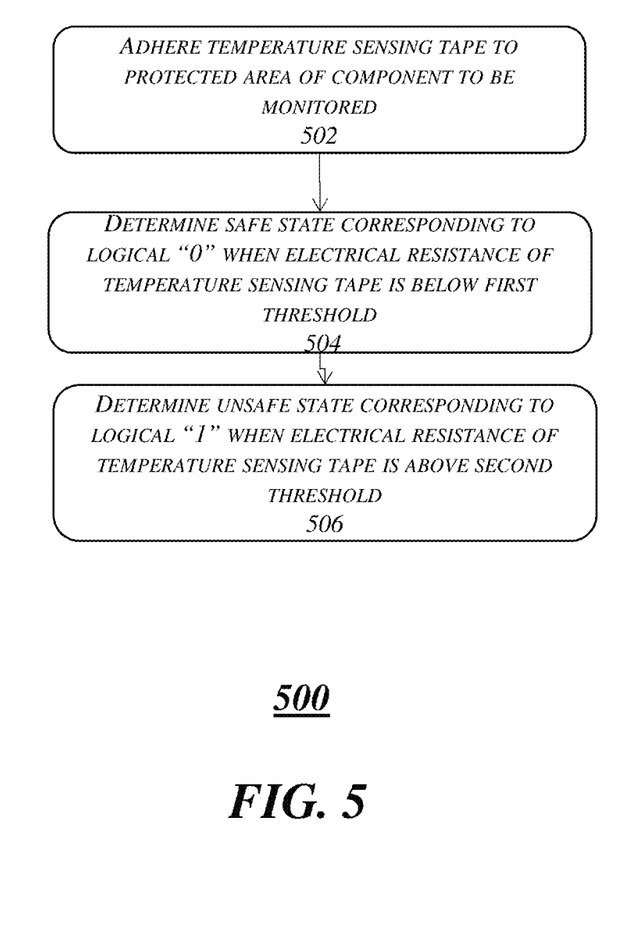
FIG. 5 depicts an exemplary logic flow.

FIG. 5 presents a logic flow 500, in accordance with embodiments of the disclosure. At block 502, a temperature sensing tape is adhered to a protected area of a component to be monitored. In some embodiments, the protected area may multiple different areas. The component to be monitored may be a battery in some embodiments. The temperature sensing tape may include one or more sensing areas (such as a given sensing area and an additional sensing area), where a given sensing area overlaps with the protected area. The sensing area may include a temperature sensing element and a meltable fuse element that is characterized by a melt temperature, arranged in an electrical circuit. In some embodiments, the multiple different sensing areas are arranged to overlap with the protected area where the temperature sensing tape is adhered to the component. As such, the sensing area(s) are arranged in good thermal contact with the component.

At block 504, a safe state corresponding to a logical "0" (or alternatively a logical "1") is determined when the resistance of the temperature sensing tape lies below a first threshold. At block 506 an unsafe state corresponding to a logical "1" (or alternatively a logical "0") is determined when the resistance of the temperature sensing tape is above a second threshold. The second threshold may generally be greater than the first threshold.

It will be appreciated by those of ordinary skill in the art that the tape 10 can be manufactured and implemented in an electrical device at a lower cost and with less complexity relative to traditional temperature sensing devices.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

We claim:

1. A temperature sensing tape comprising:
   an electrically insulating substrate;
   a conductive circuit, disposed on the electrically insulating substrate;
   a temperature sensing element, disposed on the electrically insulating substrate, in electrical series with the conductive circuit, the temperature sensing element comprising a first electrode and a second electrode disposed in a confronting, spaced-apart relationship to define a gap therebetween, and a variable resistance material disposed within the gap and connecting the first electrode to the second electrode, the variable resistance material having a positive temperature coefficient characteristic, characterized by a trip temperature; and
   a meltable fuse element, disposed in electrical series with the conductive circuit, and in proximity to the temperature sensing element within a sensing area, wherein the meltable fuse element is characterized by a melt temperature, greater than the trip temperature.

2. The temperature sensing tape of claim 1, the trip temperature being in a range of 50° C. to 100° C.

3. The temperature sensing tape of claim 1, the melt temperature being in a range of 90° C. to 150° C.

4. The temperature sensing tape of claim 1, the meltable fuse element comprising SnBi, In, InSn, or SnPb.

5. The temperature sensing tape of claim 1, the temperature sensing element being disposed on an "in" line of the conductive circuit, and the meltable fuse element being disposed on an "out" line of the conductive circuit.

6. The temperature sensing tape of claim 1, the temperature sensing element and the meltable fuse element being disposed on an "in" line of the conductive circuit.

7. The temperature sensing tape of claim 1, the conductive circuit comprising:
   a first conductor disposed on the electrically insulating substrate and terminating in the first electrode; and
   a second conductor disposed on the electrically insulating substrate and terminating in the second electrode, wherein the electrically insulating substrate, the first conductor, and the second conductor are formed of flexible materials.

8. The temperature sensing tape of claim 1, wherein each of the first electrode and the second electrode includes a plurality of tines, the tines of the first electrode disposed in an interdigitated relationship with the tines of the second electrode.

9. The temperature sensing tape of claim 1, comprising at least one additional sensing area, wherein the at least one additional sensing area comprises a second temperature sensing element and a second meltable fuse element, the at least one additional sensing area being disposed in the conductive circuit.

10. The electrical device of claim 1, the meltable fuse element comprising SnBi, In, InSn, or SnPb.

11. An electrical device, comprising:
    a protected component;
    a temperature sensing tape, thermally coupled to the protected component, the temperature sensing tape comprising:
      an electrically insulating substrate;
      a temperature sensing element, disposed on the electrically insulating substrate, and comprising a variable resistance material having a positive temperature coefficient characteristic, characterized by a trip temperature; and
      a meltable fuse element, disposed on the electrically insulating substrate in proximity to the temperature sensing element within a first sensing area, the meltable fuse element and the temperature sensing element being arranged in an electrical circuit, wherein the meltable fuse element is characterized by a melt temperature, greater than the trip temperature; and a control element, electrically connected to opposite ends of the electrical circuit.

12. The electrical device of claim 11, the control element comprising logic to determine a logical "0" when a measured resistance of the electrical circuit is below a first threshold, and to determine a "logical "1" when the measured resistance of the electrical circuit is above a second threshold.

13. The electrical device of claim 11, wherein the protected component is a battery.

14. The electrical device of claim 11, comprising at least one additional sensing area, wherein the at least one additional sensing area comprises a second temperature sensing element and a second meltable fuse element, the at least one additional sensing area being disposed in the electrical circuit.

15. The electrical device of claim 11, the trip temperature being in a range area of 50° C. to 100° C.

16. The electrical device of claim 11, the melt temperature being in a range of 90° C. to 150° C.

17. A method of protecting a component, comprising:
    adhering a temperature sensing tape to at least one protected area of the component, the temperature sensing tape having a temperature sensing element comprising a positive temperature coefficient characteristic, characterized by a trip temperature, and a meltable fuse element, disposed in in proximity to the temperature sensing element within a sensing area, wherein the meltable fuse element is characterized by a melt temperature, greater than the trip temperature;
    determining a safe state corresponding to a logical "0" when an electrical resistance of the temperature sensing tape is below a first threshold; and determining an unsafe state corresponding to a logical "1" when the electrical resistance of the temperature sensing tape is above a second threshold.

18. The method of claim 17, wherein the temperature sensing element and the meltable fuse element are arranged in an electrical circuit, wherein a resistance of the electrical circuit is maintained above the second threshold when a temperature of the sensing area is above the trip temperature and above the melt temperature.

\* \* \* \* \*